May 17, 1966 W. E. SIMAS 3,251,497
PORTABLE OVERHEAD BIN WITH TRAILER
Filed March 30, 1964 5 Sheets-Sheet 1
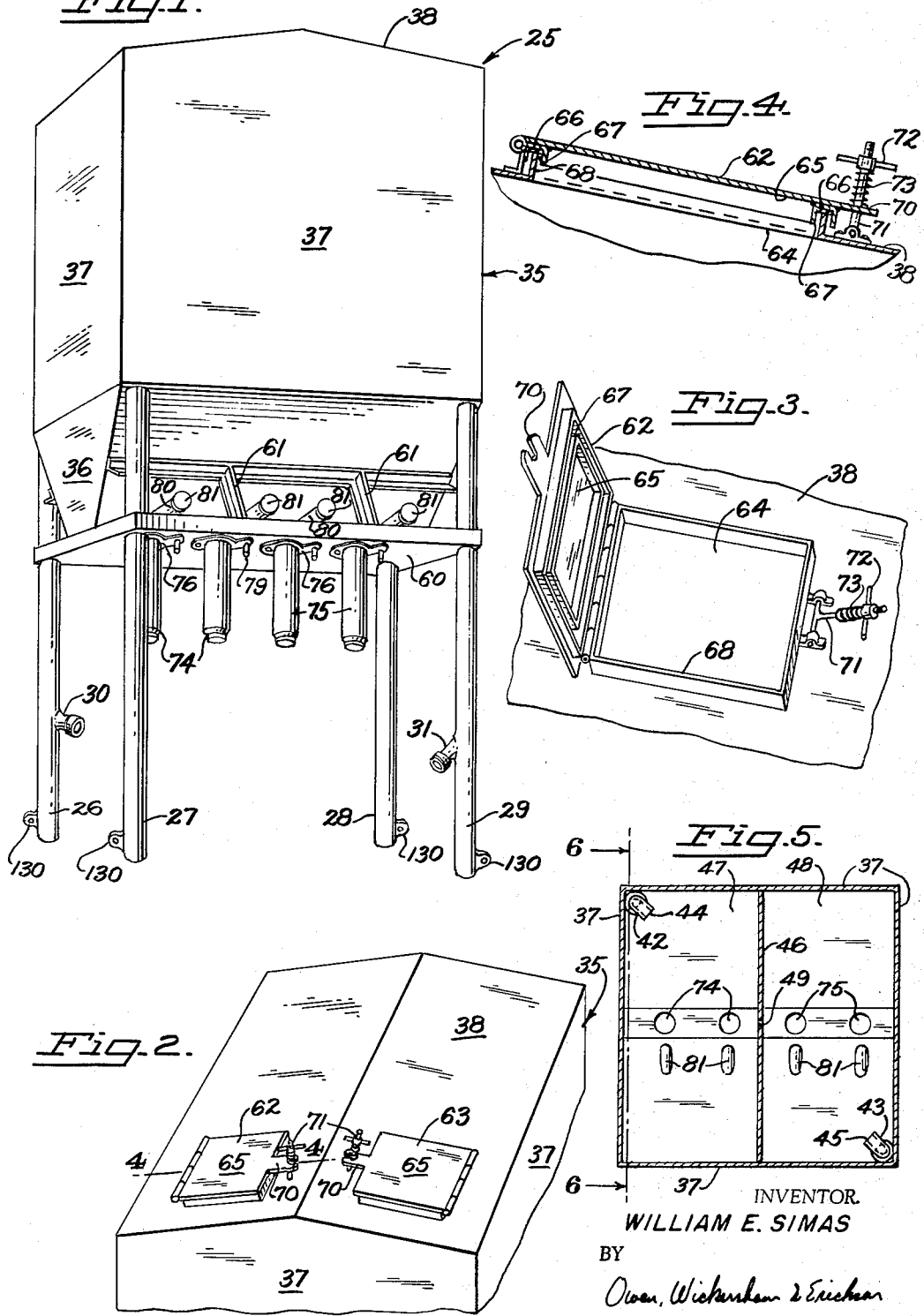
INVENTOR.
WILLIAM E. SIMAS
BY
Owen, Wickersham & Erickson
ATTORNEYS

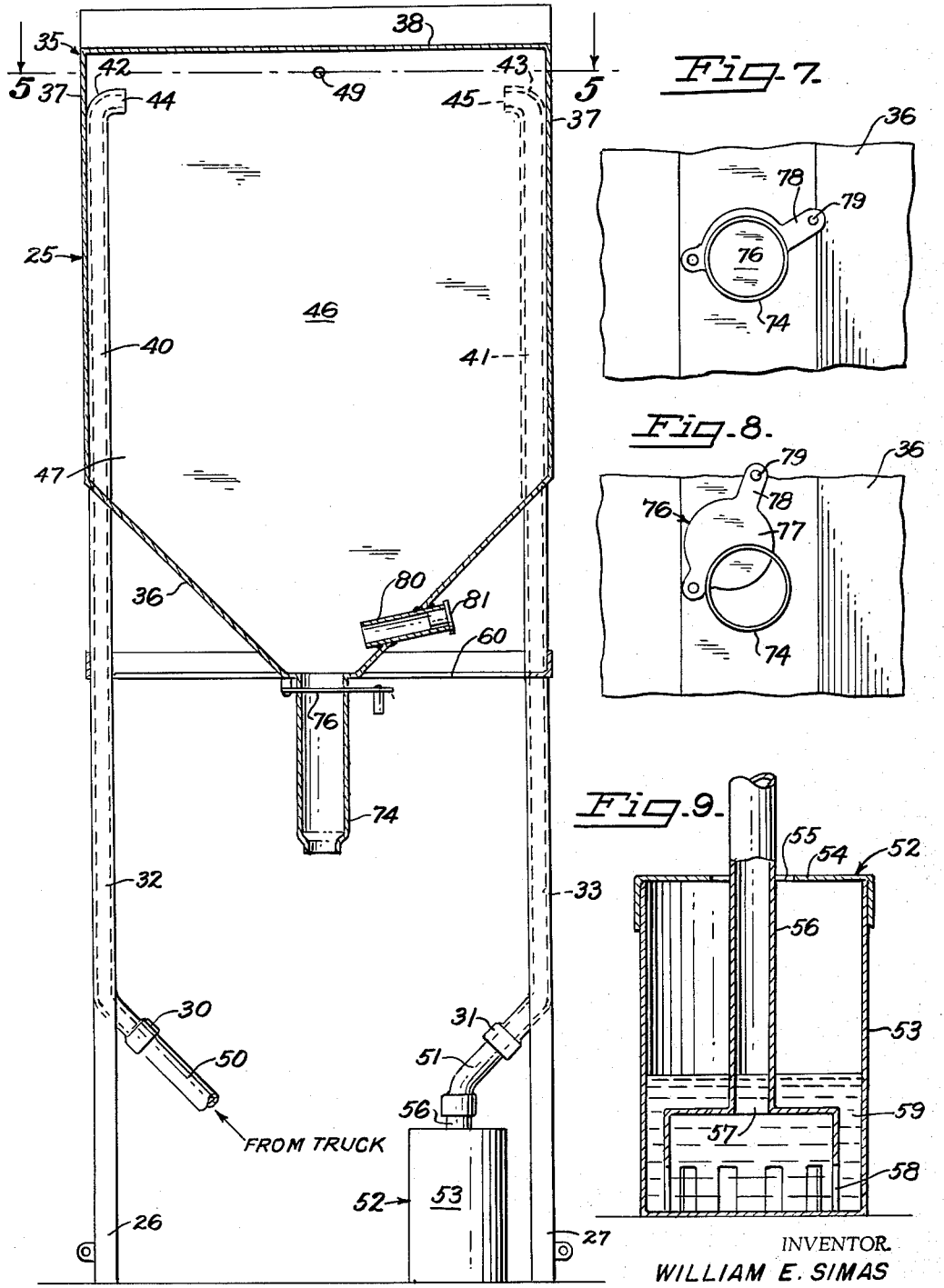

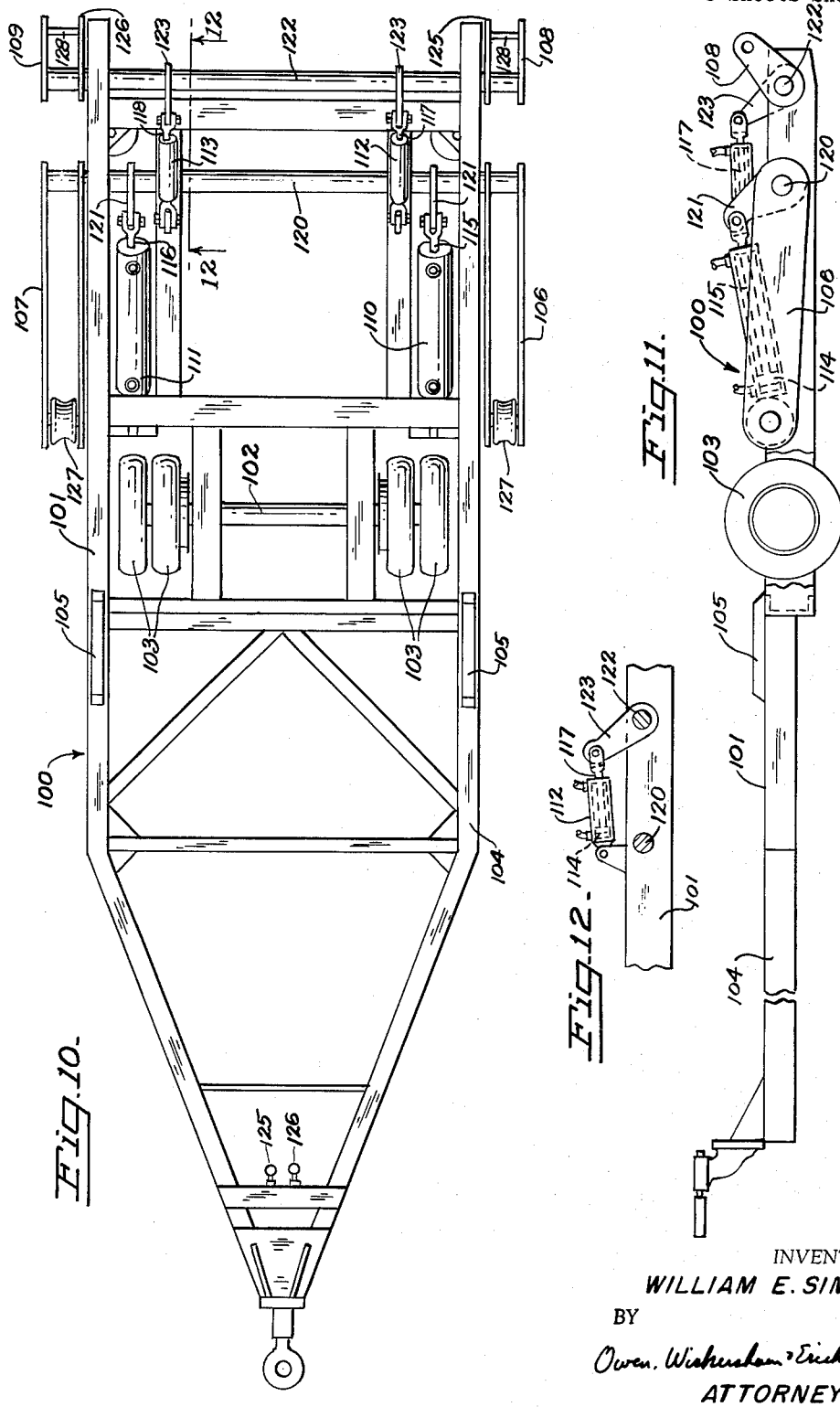

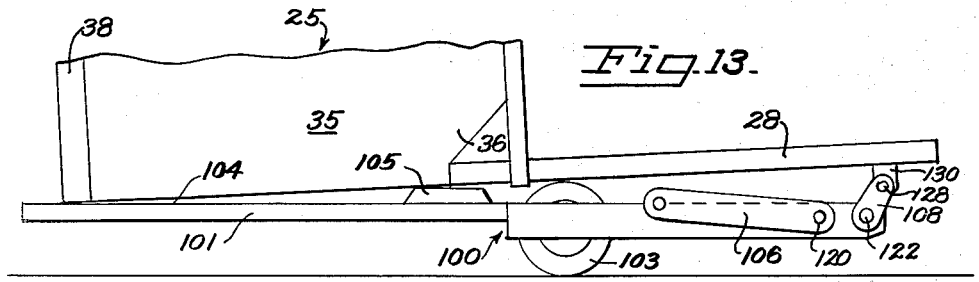
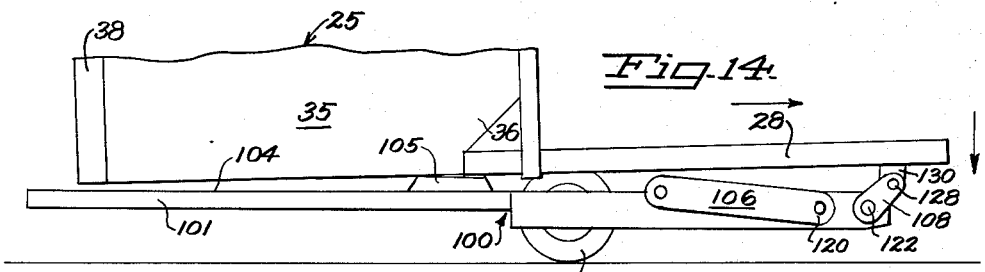
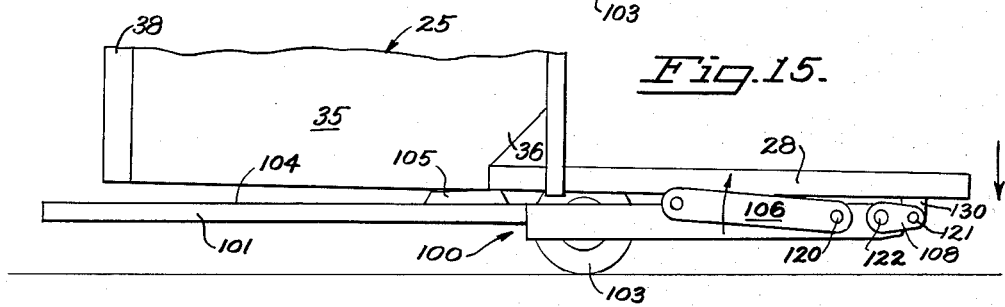
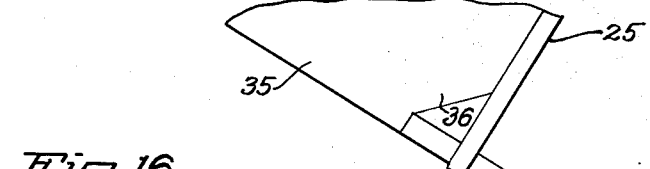
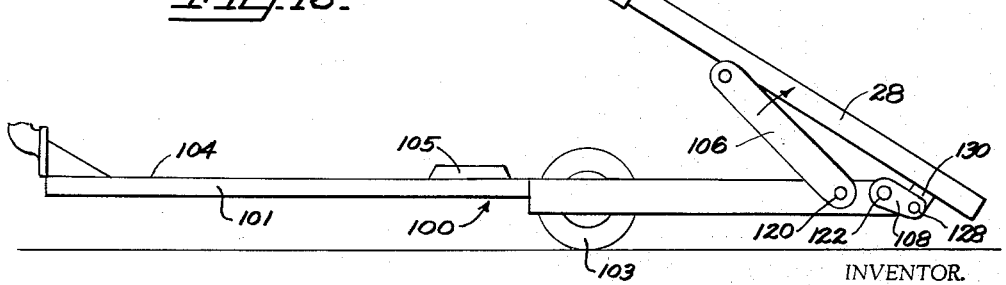

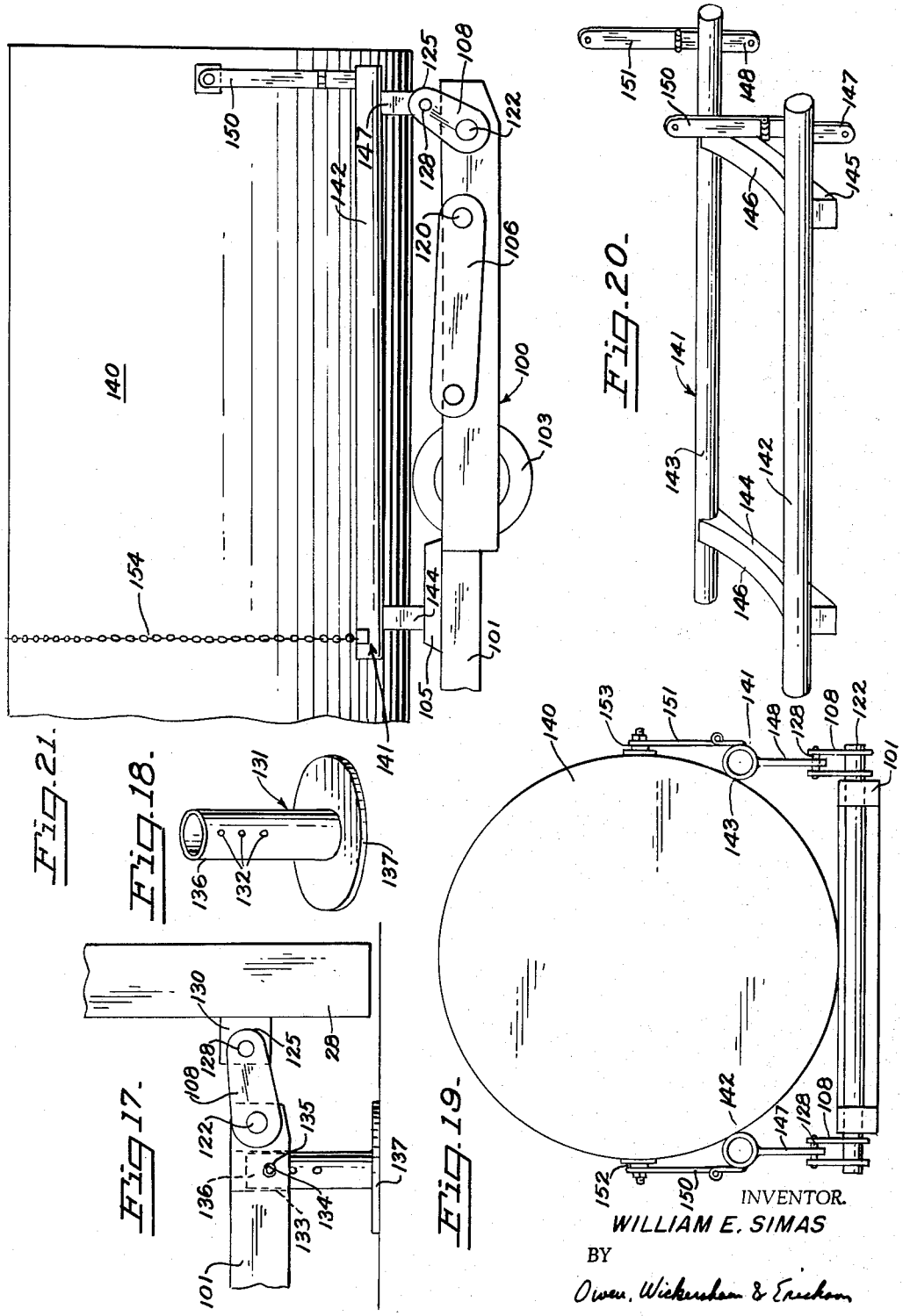

United States Patent Office 3,251,497
Patented May 17, 1966

3,251,497
PORTABLE OVERHEAD BIN WITH TRAILER
William E. Simas, Salinas, Calif., assignor to The Triangle Co., Salinas, Calif., a corporation of California
Filed Mar. 30, 1964, Ser. No. 355,738
9 Claims. (Cl. 214—515)

This invention relates to a novel portable overhead bin and to its combination with a novel trailer for moving the portable bin from place to place.

When fertilizing a farm, it is desirable to have a large overhead bin close to the area being fertilized. The bin can be refilled by large trucks and can then be used to dispense the fertilizer to fertilizer spreaders, small trucks, and other small vehicles that take the fertilizer directly into the field and put the fertilizer on or into the ground. With such a bin closeby, the spreaders and small-capacity trucks do not have to make long and frequent trips to the farm or ranch headquarters, which may be many miles away from the area being fertilized.

However, it is not desirable to spend the capital that would be needed to install a large number of bins and set one up at each desirable location, some of which may not be used for months at a time. The dilemma between having only a few bins with many long hauls of small loads and having many bins lying unused most of the time, is dissolved by the present invention which provides a portable overhead bin. This portable bin can be moved from place to place whenever and wherever desired, can remain at any desired location as long as the nearby parts of the ranch or farm are being fertilized, and then can be moved to another location.

The portable bin of this invention is useful, not only on large ranches, but also on smaller ranches and farms, several of which can get together and maintain one or more such bins, moving them from ranch to ranch or farm to farm so that each farmer has an opportunity to hold his fertilizing costs down. Moreover, the bin can be used for other operations besides fertilizing, wherever it is desirable to have a movable storage bin. Portable liquid storage tanks for liquid fertilizer and other liquids may also be used in the same manner.

Three of the main problems that had to be solved in order to achieve portability relate (1) to the structure of the bin, (2) to the provision of a suitable vehicle for transporting the bin from place to place, and (3) to means for putting up and taking down the bin. Among the objects of the invention are the solutions to these problems and the provision of special equipment making it relatively simple to achieve the desired ends.

In addition, the portable bin of this invention possesses several important advantages. Its structure is rigid enough to endure being moved from place to place over rough roads and through fields; the structure is also simple and free from loose pieces that might interfere with its portability. The invention provides a simple means for filling the bin, and for evacuating air while the filling is going on; it provides for efficient use of the bin outlets and for a simple and effective remedy in case the outlets become plugged. In addition, there are many other significant features which will be discussed below.

As to the trailer itself, it may be used not only for the bin about to be described but also for other similar containers such as liquid storage tanks, simply by changing from a flat bed which supports the bin housing to a cradle which supports a cylindrical housing. During erection and taking down of the bin, special equipment provided by this invention is particularly useful.

Other objects and advantages of the invention will appear from the following description of a preferred embodiment.

In the drawings:

FIG. 1 is a view in perspective of a portable bin embodying the principles of the invention, FIG. 2 is a fragmentary view in perspective of the upper portion of the bin, showing the roof and its novel pressure-relieving hatches, FIG. 3 is an enlarged fragmentary view in perspective of one of the hatches in its wide open position, FIG. 4 is an enlarged view in section taken along the line 4—4 in FIG. 2, FIG. 5 is a horizontal sectional plan view taken along the line 5—5 in FIG. 6, but on a reduced scale, FIG. 6 is a slightly enlarged view in elevation and in section of the bin, taken generally along the line 6—6 of FIG. 5 but with the section line angled in, in part, to show one of the outlet valves and related parts in section. At the bottom right, one filling conduit is shown converted to an air exhaust filter that is used while filling through the other conduit, FIG. 7 is a fragmentary bottom plan view of one of the outlet valves in its closed position, FIG. 8 is a view similar to FIG. 7 with the outlet valve in a partially open position, FIG. 9 is an enlarged view in elevation and in section of the exhaust filter connection of FIG. 6, FIG. 10 is a top plan view of the trailer for transporting, erecting and taking down the bin of FIG. 1, FIG. 11 is a view in side elevation of the trailer with some frame portions broken away to show parts behind and with a portion broken in the middle to conserve space, FIG. 12 is a fragmentary view in section taken along the line 12—12 in FIG. 10, showing one of the hydraulic lifting and holding cylinders and some adjacent parts of the frame, FIG. 13 is a simplified view in side elevation of the trailer with the bin mounted thereon in its transportation position. About half of the bin has been broken off to conserve space, FIG. 14 is a view like FIG. 13, showing the trailer and bin at the commencement of the erection of the bin, FIG. 15 is a view like FIG. 14 showing the elements in a later stage of erection, FIG. 16 is a view like FIG. 15 showing a still later stage of erection, FIG. 17 is a fragmentary enlarged view of portions of the trailer and one leg of the erected bin, illustrating how the leg is leveled, FIG. 18 is a perspective view of one leveling pad, FIG. 19 is a view in rear end elevation of the trailer with a liquid-storage tank thereon in transporting position, FIG. 20 is a view in perspective of a cradle frame for the liquid storage tank, FIG. 21 is a fragmentary view in side elevation of the rear portion of the trailer-tank combination.

A typical bin 25 of this invention has four supporting legs 26, 27, 28 and 29. The diagonally opposite legs 26 and 29 are hollow and are provided with inlet spouts 30 and 31 leading into conduits 32 and 33 respectively. The legs 26, 27, 28 and 29 support an elevated hopper housing 35 with a hopper-shaped lower end 36, side walls 37, and a roof 38. The conduits 32 and 33 extend above the hollow legs 26 and 29 into the hopper housing 35 where they become long tubes 40 and 41 secured to the walls 37, each tube 40 and 41 having a ninety degree elbow 42, 43 at its upper end, terminating in an outlet 44, 45. A vertical partition 46 divides the hopper 35 into two sections 47 and 48, each being filled through its respective conduit 32 or 33, alternatively. The outlet spouts 44 and 45, point out horizontally at an angle of about 45 degrees with respect to the hopper side walls, as seen in plan (FIG. 5). An opening 49 through the upper end of the partition 46 provides for air passage from one bin compartment 47 or 48 to the other.

During filling, a large truck with a compressed-air supply and a large load of fertilizer is driven up, and the air hose of the truck is attached to one of two flexible conduits 50 and 51 that are removably attached to the ends of the inlet spouts 30 and 31; compressed air is then used to carry the fertilizer into the conduit 50 and through the inlet spout 30, up through the conduit 32 and the tube 40, and out at the top outlet 44, the fertilizer falling down into the compartment 47. The compressed air introduced from the truck's compressor, in order to convey the fertilizer, then flows through the opening 49 into the compartment 48 on the other side of the partition 46, enters the spout outlet 45, passes down the tube 41 and the conduit 33 to the filling inlet 31 and into the flexible conduit 51.

Preferably, the conduit 51 is attached to a dust filter 52, which includes a cylindrical drum or container 53 having an upper end 54 that is closed except for an outlet 55 that is substantially larger than an inlet tube 56 which is attached to the conduit 51. The dust-laden air goes down the inlet tube 56, out its bottom end 57, and through a sparger 58 comprising a cylindrical shell having a series of bottom cutaway portions to serve as outlets. The sparger 58 is immersed in water 59 in the lower end of the drum 53, and the dust is trapped by the water, while the air flows up through the water and out through the outlet passage 55 around the tube 56.

When one compartment 47 of the hopper 35 has been loaded, the flow paths are reversed: the truck's air-conveyed fertilizer is conveyed in through the flexible conduit 51 to fill the compartment 48 and the dust filter 52 is then connected to the flexible conduit 50.

To strengthen it, the bin is provided with suitable supporting struts and braces 60, 61 at the lower end of the hopper 35, connecting the hopper 35 to the legs 26, 27, 28 and 29 and the legs to each other.

The roof 38 of the bin is provided on each side (i.e. above each compartment 47 and 48) with a spring loaded hatch 62, 63, each of which acts as an independent relief valve in case the air pressure builds up too high inside the hopper 35. This applies not only during loading but also as a safety valve if some chemical action should take place in the fertilizer (or other commodity being stored) during the storage period to develop internal pressure. Each hatch 62, 63 comprises a hatch opening 64 and a hatch cover 65. The hatch cover 65 has a rubber gasket 66 in a channel 67 so that it can be closed quite tight against a rim 68 around the opening 64. The cover 65 has a catch 70 which is secured by a pivotal latch 71 having an upper handle 72. A spring 73 is compressed between the catch 70 and the latch handle 72 when the hatch cover 65 is closed. Thus air pressure can push the hatch cover up against the pressure of the spring 73 enough to let the air pass out, while still retaining the solid contents.

Each compartment 47, 48 preferably has two outlet tubes 74 or 75, each of which is normally closed by an individual gate valve 76. To each tube 74 or 75 may be connected, during use, a flexible corrugated conduit (not shown). Each gate valve 76 comprises a pivoted gate plate 77 having a handle portion 78 with a hole 79 which may be engaged with a suitable rod from a truck and opened or closed as desired.

A feature of the invention is an access tube 80 above each gate valve 76. Each access tube 80 is normally closed by a cover 81, and it extends through the walls to a point above and closely adjacent to the upper end of the gate valve 76, in the hopper portion above it. A straight bar or pole can be inserted through the access tube 80 after the cover 81 is removed and can be manipulated to break up material which might be caked and bridging over the outlet 74, thereby freeing the fertilizer material so that it once again flows freely.

The invention provides a trailer to transport the bin 25. The trailer 100 has an elongated frame 101 supported on a single axle 102 by a series of wheels 103. The frame 101 has the normal lengthwise, widthwise, and diagonal strengthening members to support the weight of the bin 25, which, although transported empty, is of substantial weight. The forward portion of the trailer provides support for the hopper portion 35 of the bin 25 by a flat bed portion 104 and by a pair of pads 105 which lift the bottom portion of the hopper 35 higher than the top. In an alternative form a cradle may be provided for holding the bin hopper 35 and hold-down chains may be provided to help retain it.

After the rear end of the trailer 100 are two pairs of levers 106, 107 and 108, 109 all of which are hydraulically operated by cylinders 110, 111, 112 and 113 respectively. The cylinders have pistons 114 and connecting rods 115, 116 and 117, 118 that act through a crank system. The rods 115 and 116 are pivotally connected to a rotatable shaft 120 by cranks 121 and the rods 117 and 118 are pivotally connected to shaft 122 by cranks 123. The shafts 120 and 122 are rigidly secured to the lever pairs 106, 107 and 108, 109 respectively. The hydraulic cylinders 110, 111, 112, and 112 are controlled at the forward end of the trailer by levers 125 and 126, a source of hydraulic pressure being provided in the truck, as is normal in such trucks. The connections are made in the usual manner, and the power obtained is controlled by manipulating the levers 125 and 126. Each lever 106 and 107 supports a concave roller 127 at its forward end, and each lever 108 and 109 has a shaft 128 at its outboard end 125, 126.

To explain the operation of the levers 106, 107, 108 and 109 and their use, let us consider the setting up of a bin 25, it being understood that the bin 25 is taken down in the same way but in reverse order. At the start, the legs 28 and 29 are supported at their bottom ends on the shafts 128 of the levers 108 and 109, the shafts 128 passing through a lug 130 on each of the legs 28 and 29. In the traveling position, the rear levers 108 and 109 are elevated, and the bin 25 is supported with the lower end of its legs 28 and 29 somewhat elevated with respect to the hopper 35, the hopper 35 resting on the pads 105, which are located forward of the wheels 103, so that the center of gravity is toward the front of the trailer 100. It will be appreciated that with the trailer 100 connected by a fifth wheel to a truck, the center of gravity should be forward of the trailer wheels 103. Chains are at this time fastened around the legs 28 and 29 to help to hold the bin 25 securely when passing over rough ground, as is often the case in agricultural machinery.

When the desired location is reached and unloading is to begin, the rear set of hydraulic cylinders 112 and 113 are first actuated to swing the levers 108 and 109 down. (See FIGS. 13–15.) This also has the effect of moving the entire bin 25 slightly toward the rear, since the legs 28 and 29 are fastened by their lugs 130 to the shafts 128. The bin's legs 28 and 29 are pulled downwardly, the entire bin 25 pivoting on the pads 105 until the bin legs 28 and 29 contact and rest on the rollers 127. Next the front hydraulic cylinders 110 and 111 are actuated, causing elevation of the raising arms 106 and 107 and of the bin 25, with the bin legs 28 and 29 being pulled down. Thus the bin 25 is elevated, and the motion continues swinging around in an arcuate path until the bin 25 is substantially vertical. In the meantime, this action causes the legs 26, 27, 28 and 29 to touch the ground, the action being restrained by the connection between the legs 28 and 29 and the rear lever shafts 128 and by the chains, so that the bin 25 does not roll over past its center of gravity and fall down. It is thence gently put in position.

It may be that the bin 25 is to be used in a place which is not completely level. For this purpose, pads 131 (FIG. 18) are provided with perforations 132 and the trailer's frame 101 is provided with a cylindrical sleeve 133 having a perforation 134 and a latching stud 135. The pads 131 have a stem 136 that is placed inside the sleeve 133, and one of the perforations 131 is aligned with the perforation 134 and held in that position by the stud 135. The rear of the frame 101 is pulled down by the weight of the bin 25 when the bin 25 is in its vertical position, and rests on a foot 137 of the pad 131. The levers 108 and 109 that are operated by the rear hydraulic cylinders 112 and 113 can then be used to adjust and level the legs 26, 27, 28, 29, with a good range of elevation being obtained by movement of the levers 108 and 109. The levers 108 and 109 also can be used as jacks in conjunction with the vertical support of the pads 131.

A cylindrical tank 140 (FIGS. 19 and 21) can also be handled by the trailer 100, by use of a cradle attachment 141 shown in FIGS. 19–21. The cradle 141 comprises two longitudinal tubes 142 and 143 joined by cross members 144 and 145 having arcuate upper surfaces 146. Depending rigid rear bars 147 and 148 are rigidly connected to the tubes 142 and 143 near their rear ends and are pivotally connected to the shafts 128 of the rear levers 108 and 109. Upwardly extending members 150 and 151 pivotally connect the tubes 142 and 143 to studs 152, 153 that are welded to the sides of the tank 140. A chain 154 helps to secure the tank 140 to the cradle 141. Thus, although the tank 140 has no legs, the studs 152, 153 serve the same purpose as the legs 130, and the cross member 146 cooperates with the pad 105 to give generally the same effect as that obtained from the bin 25. The levers 106 operate in the same manner, through the cradle 141, and erection of the tank 140 is therefore substantially the same as that of the bin 25.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A large movable container combination, comprising
    a large storage container having a body and a pair of lug means near its lower end, and
    a trailer for transporting said storage container in its horizontal position and for erecting it to a vertical position, said trailer having
    an elongated wheel-supported frame having a forward end and a rear end,
    pad means on a forward portion of said frame on which said body rests in its horizontal position,
    a first pair of levers pivotally supported on said frame near the rear end thereof, each having an outboard end secured to a said lug means,
    first hydraulic means for moving said first levers from a normally generally vertical container-transporting position to a rearwardly extending container-erection position, said levers being moved during erection to lower the lower end of said container and tilt it down toward the rear end,
    a second pair of levers pivotally supported on said frame forward of said first pair, and
    second hydraulic means for moving said second levers from a normally forwardly extending substantially horizontal container-transporting position to a vertical position, thereby erecting said container,
    said second levers having bearing means for rolling contact during erection about the connection between said first levers and said lug means.

2. The combination of claim 1 wherein said container is a bin having four supporting legs, to two of which said lug means are secured, said bin having an upper hopper portion that rests directly on said pad means during transport with said bin being then forwardly and downwardly inclined.

3. The combination of claim 1 wherein said container is a generally cylindrical tank and said trailer includes a cradle having cylindrical cross support means for said tank and pivotally secured to said lug means and to said first lever means and having portions engaged by said second lever means during erection.

4. The combination of claim 1 wherein said frame has a pair of receptacles near its rear end and a pair of pads adjustably secured therein for engagement of the ground to enable leveling of said container.

5. A bin-trailer combination, comprising,
    a portable bin of the type having four supporting legs and an elevated hopper carried by said legs, two of said legs having lugs adjacent their lower ends, and
    a trailer for transporting said bin, wherein said trailer comprises,
    an elongated wheel-supported frame having a forward end and a rear end,
    bed means on a forward portion of said frame for supporting said hopper portion,
    a pair of pads intermediate the trailer ends on which said hopper portion rests horizontally during transport, for tipping said hopper portion down and said legs slightly up,
    a first pair of levers pivotally supported on said frame near the rear end thereof,
    first hydraulic means for moving said first levers from a normally generally vertical transporting position to a rearwardly extending bin erection position,
    means pivotally securing said first levers to said lugs on the lower ends of said legs, said levers being elevated during a transporting position when said legs are elevated by said pads and said levers being operated during erection of the bin to lower said legs and tilt said hopper portion up, using said pads as pivots for said bin,
    a second pair of levers pivotally supported on said frame forward of said first pair, and
    second hydraulic means for moving said second levers from a normally forwardly extending substantially horizontal position to vertical position,
    said second levers having bearing means that slide with rolling contact with said legs as said second levers are raised, to erect said bin about said first levers as a pivot.

6. The combination of claim 5 having a pair of ground-engaging pads adjustably secured to and depending from the rear end of said frame for enabling adjustment of the erected position of said bin.

7. A combination for providing movable water storage facilities, comprising
    a cylindrical tank having lug means near its lower end,
    a trailer having an elongated wheel-supported frame having a forward end and a rear end,
    a first pair of levers pivotally supported on said frame near the rear end thereof and having an outboard end,
    first hydraulic means for moving said first levers from a normally generally vertical transporting position to a rearwardly extending bin erection position,
    a second pair of levers pivotally supported on said frame forward of said first pair,
    second hydraulic means for moving said second levers from a normally forwardly extending substantially horizontal position to vertical position, and
    a cradle having longitudinal side members and arcuate cross members receiving said cylindrical tank and supporting it, each said cradle side member having a depending link connected pivotally to a said first lever and an upstanding link connected pivotally to a said lug on said tank,
    each said second lever having bearing means that slides with rolling contact with a said cradle side member as said second levers are raised, to erect said cradle and tank to a vertical position about said first levers as a pivot.

8. A trailer in combination with a portable bin of the type having four supporting legs and an elevated hopper carried by said legs, said trailer comprising:
  an elongated wheel-supported frame having a forward end and a rear end,
  bed means on a forward portion of said frame for supporting said hopper portion,
  a pair of pads intermediate the trailer ends for tipping said hopper portion down and said legs slightly up,
  a first pair of levers pivotally supported on said frame near the rear end thereof,
  first hydraulic means for moving said first levers from a normally generally vertical transporting position to a rearwardly extending bin erection position,
  means for securing said first levers to the lower ends of a pair of said legs, said levers being elevated during a transporting position when said legs are elevated by said pads and said levers being operated during erection of the bin to lower said legs and tilt said hopper portion up, using said pads as pivots for said bin,
  a second pair of levers forward of said first pair,
  second hydraulic means for moving said second levers from a normally forwardly extending substantially horizontal position to vertical position,
  said second levers having bearing means that slide with rolling contact with said legs as said second levers are raised, to erect said bin about said first levers as a pivot.

9. The trailer of claim 8 having a pair of ground-engaging pads and means for adjustably securing them to the rear end of said frame, depending therefrom, to aid in adjusting the erected position of a said bin.

References Cited by the Examiner
UNITED STATES PATENTS

| | | | |
|---|---|---|---|
| 1,289,786 | 12/1918 | Ittner | 214—515 |
| 2,474,205 | 6/1949 | Welty | 302—59 |
| 2,606,676 | 8/1952 | Dempster | 214—515 |
| 2,708,047 | 5/1955 | Seidle | 214—515 |
| 2,743,965 | 5/1956 | Mattson et al. | 302—59 |
| 3,155,248 | 11/1964 | Haller | 214—38 |

GERALD M. FORLENZA, *Primary Examiner.*

HUGO O. SCHULZ, *Examiner.*

R. SHERIDAN, *Assistant Examiner.*